March 7, 1967  J. T. ATKINSON, JR  3,307,305
ADJUSTABLE PLANT SUPPORT
Filed June 13, 1963

INVENTOR.
Jerome T. Atkinson, Jr.
BY Stone, Nierman,
Burmeister-Zummer
Attys.

United States Patent Office 3,307,305
Patented Mar. 7, 1967

3,307,305
ADJUSTABLE PLANT SUPPORT
Jerome T. Atkinson, Jr., Wilmette, Ill., assignor to Infograph Incorporated, Northfield, Ill., a corporation of Illinois
Filed June 13, 1963, Ser. No. 287,601
4 Claims. (Cl. 52—111)

The present invention relates to supports for growing plants and more particularly to supports which are adjustable in height so that the supports may be readily raised as the plants grow in height.

It is an object to provide a novel telescoping adjustable plant support with a novel level maintaining arrangement.

It is another object of the invention to provide a simplified and improved adjustable plant support, the height of which can readily be set.

To provide these and other objects, the invention utilizes a tubular member which telescopes adjustably on a fixed height stake, the stake being driven into the ground adjacent the plant to be supported. The tube lower edge is cut on a diagonal with a single tip. The tube height may be readily adjusted by setting a simple holding collar vertically on the stake. This holding collar fits about the stake and has a shoulder for supporting the tube tip eccentrically of the rod. The eccentric pressure generated by the tube tip acts on the collar to frictionally hold the collar tightly against the stake by cocking the collar at oblique angle with respect to the stake. Thus, the adjustment may be set readily by relieving the pressure on the collar and raising or lowering the collar as required.

The device, as shown, provides an inexpensive, easy-to-assemble, compact support which can be readily adjusted for changes in the size of the plant being supported.

The invention both as to its organization and principle of operation, together with further objects and advantages thereof, will best be understood by reference to the following specification taken in connection with the accompanying drawings in which.

Figure 1:
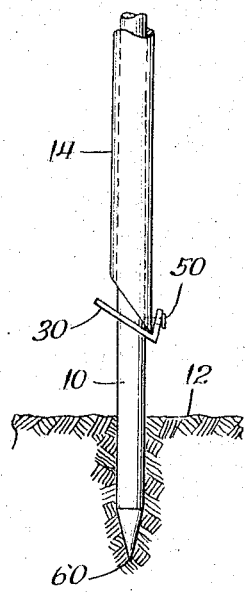
FIGURE 1 is a side elevational view of a complete plant support embodying the present invention.

Now turning to the drawings in detail, in FIGURE 1 there is shown a pointed stake 10 which is shown driven into the ground, as represented by the area marked 12. The stake as shown is round in cross-section but may have any convenient cross-sectional shape such as rectangular, triangular or oval. The stake is however straight in its vertical extent.

Figure 3:
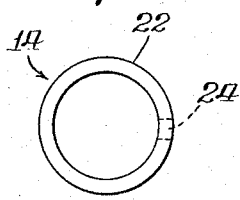
FIGURE 3 is a plan view of the tube of FIGURE 1.
Figure 4:
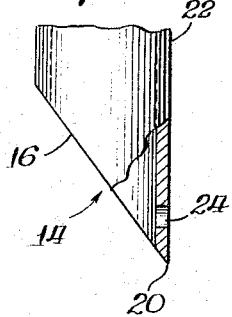
FIGURE 4 is a side elevational view of the tube of FIGURE 3.
Figure 5:
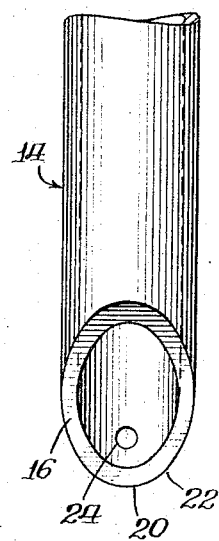
FIGURE 5 is an elevational view of the tube of FIGURE 4 rotated 90° about its axis.

Telescoping over the top of the stake 10 is a tube 14 shown in detail in FIGURES 3–5. The tube of plastic, metal or other suitable material, as shown is round, but again may be formed in any convenient shape. The tube function will not change for any of the shapes utilized. The tube 14 is regular in cross-section for most of its length but its lower edge 16 is cut at a diagonal terminating in a single plane surface which forms an acute angled tip 20 with the tube side wall 22 as shown in FIGURE 4. Spaced a short distance above this bottom tip 20 of the tube is a circular opening 24 in the tube side wall, the function of which will be explained.

At the top of tube 14, there may be provided suitable wire holders or the like, not shown, which fit about plants to be supported in a manner well-known in the art. Such holders may be in the shape of a ring with a loop or the free ends fitted into the tube hollow center. In another form, also not shown, aligned holes may be pierced adjacent the tube top end to accept a wire holder threaded therethrough to be affixed to the plant. In a more simple manner, a string or wire may be passed about the exterior of the tube for tying about the plant or plants being supported. Whichever of these forms of top end tie is used, the functioning of the adjustability which forms the core of the present invention remains unchanged.

Figure 6:
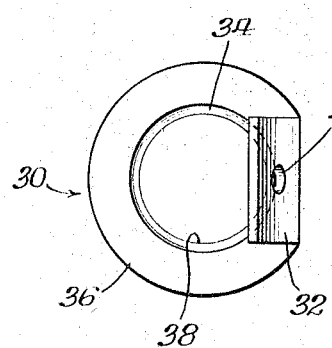
FIGURE 6 is a plan view of the collar used herein.
Figure 7:
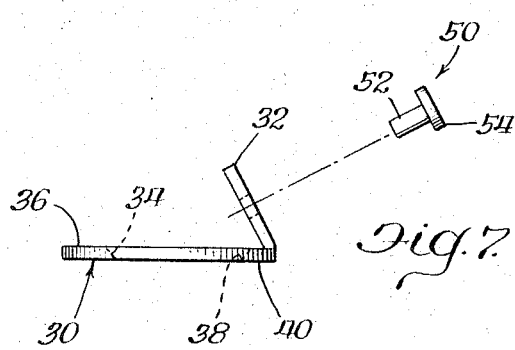
FIGURE 7 is a side elevational view of the collar of FIGURE 6, with a holding rivet shown in a removed or exploded condition therefrom.

To set the height of the tube on the stake, a collar 30 is employed. This collar, shown in detail in FIGURES 6 and 7 is fabricated, by stamping, forming or other suitable means, of metal such as steel. The collar is generally planar with a shoulder 32 extending upwardly from the main plane of the collar. The collar 30, as shown, is annular with a central circular opening 34. The opening 34 is beveled from a wide opening at its upper surface 36 to a smaller circular opening 38 at its lower surface 40. This smaller opening 38 is, however, slightly larger than the diameter of stake 10 so that the collar may readily be moved vertically in an axial direction along the stake 10. The angle between surface 36 and shoulder 32 should be slightly greater than the angle at the tube tip 20 between plane 18 and tube side wall 22; the collar angle may approach 90°. Extending normally through shoulder 32 is a circular aperture 42 of approximately the same size as opening 24 in tube 14. This aperture 42 is spaced from the adjacent upper collar surface 36 a distance approximately equal to the distance or spacing between opening 24 and the bottom tip 20 of the tube.

As mentioned, collar 30 is annular and the collar has a circular opening 34 in its main portion. The collar need not be annular and may be fabricated into any suitable shape. The same is true of central opening 34 except that this opening preferably should be the same shape as stake 10 and should be slightly larger than the stake to be movable therealong.

In FIGURE 7, there is shown a headed rivet 50. This rivet has a circular shank 52 sized to fit snugly into the opening 24 of tube 14 and aperture 42 of collar 32 when aligned. The shank 52 must be sufficiently long to extend through both openings 24 and 42 and to terminate adjacent the surface of stake 10. The rivet head 54 is, of course, larger in diameter than the shank 52 and is larger than the diameter of aperture 42.

Figure 2:
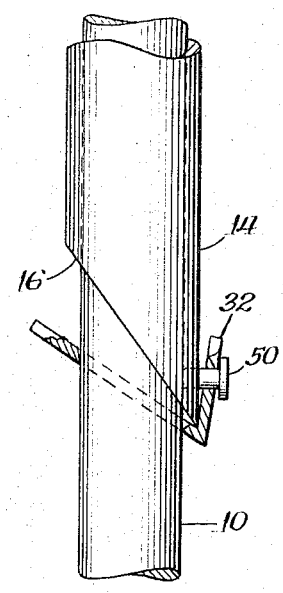
FIGURE 2 is a partial view in elevation of the mounting collar, rod and tube assembled as shown in FIGURE 1.

To assemble the support, the pointed tip 60 of the stake is driven vertically into the ground an amount sufficient to provide stability for the support. Collar 30 is then placed over the stake 10 with opening 34 encircling the stake and shoulder 32 extending upwardly. The collar may then be dropped on to the stake near the desired level. The tube 14 is then placed in telescoping relation over the stake with tip 20 extending downwardly. The tube 14 is lowered on the stake until the tube top surface is at the desired height. At that time, the collar is raised on the stake to a level just below the bottom diagonal surface 18 of the tube. The collar is then slightly cocked manually toward the angle of FIGURES 1 and 2. The tube is then released onto the collar 30 and shoulder 32. The tube tip 20 exerts a downward gravitational force on the collar eccentrically of the stake adjacent collar shoulder 32. This force further cocks the collar on the stake and causes the narrow opening 38 of the collar to frictionally grasp the stake 14 on its outer surface. The collar is rotated until aperture 42 is aligned with opening 24, at which time rivet 50 is inserted into the aligned openings 24 and 42 to lock the relative position of the tube and stake. The plant support means, not shown, is then arranged with respect to the stake and plant. The weight of such holders adds further weight eccentrically on collar 30 and causes narrow opening 38 to firmly grasp the adjacent stake outer surface.

At any future time, as for example when the plant has grown, the support may be adjusted upwardly in a simple manner. Collar 30 is elevated slightly upwardly at the shoulder end so that the opening 34 is almost normal to the stake axis. To perform this action, it is preferable that rivet 50 be removed and the downward force of the tube 14 on collar 30 be temporarily relieved. The collar is then slid upwardly to the height at which it is required to be set and is then cocked downwardly or depressed at its shoulder end. The tube tip 20 is released to depress the shoulder end of the collar 30 cocking the collar from a position almost normal to the stake axis to the oblique position of FIGURES 1 and 2. Rivet 50 is then reinserted into the aligned openings 24 and 42 to lock the position of the tube and collar.

Figure 8:
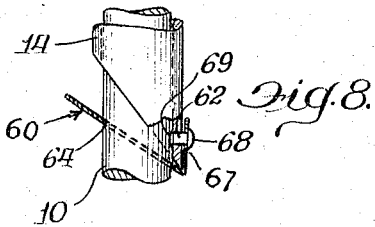
FIGURE 8 is a partial view in elevation of an alternative holding arrangement for a tube and stake.

In the form of the invention shown in FIGURE 8, annular locking collar 60 may be permanently attached to the tip 20 of tube 14 by the use of a rivet 62, the shank of which is peened over against the inside of the tube 14. Collar 60 is fabricated of comparatively thin gauge spring steel stock with a central opening 64 of slightly greater diameter than the stake 10 and with an upstanding shoulder 66 at one edge. The shoulder has perforated therein a circular opening 67 which is alignable with the tube opening 24 to receive in mutual relation the rivet 62. The shank of rivet 62 is passed through the aligned openings with its head 68 outside the tube. The shank is peened over or otherwise headed at 69 to complete the assembly of the collar 60 to the tube 14 in permanent fashion. The collar is maintained at a slight angle with respect to the tube lower edge 16 so that the angle between the collar and the tube and stake axis is less than 90°.

To fit the assembly of FIGURE 8 on the stake, the angular relation of the collar 60 to the tube lower edge 16 is increased by depressing the collar. The collar and tube are telescoped over the stake and the depressed collar will readily slide down the stake until the desired height is reached, at which time the collar is allowed to restore to its normal angular position with respect to the tube lower edge. In this position, the collar will be cocked with respect to the stake axis and will hold the tube firmly on the stake by its spring action acting on the stake.

Alternatively, the tube tip may be affixed to the collar by welding or other permanent connection so that the gravitational force exerted by the collar is directed eccentrically on the collar to cock it at an oblique angle on the stake 10.

Figure 9:
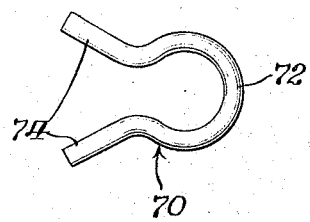
FIGURE 9 is a plan view of a spring clip which forms an alternative locking device for the invention.

It can readily be seen that the use of the rivets to hold the collar and tube together are but one type of expedient which may be used and which has been employed for its simplicity and ease of assembly. Other expedients which could be used may include a substantially U-shaped spring clip 70 of FIGURE 9 which fits about the collar shoulder 32 and tip 20 with the base 72 of the U abutting against the shoulder 32 and the outwardly inclined wings 74 of the clip sliding about the sides of tube tip 16 to hold the tube against rotation off collar 30. Alternatively, and also not shown, the shoulder could be fabricated with U-shaped arms extending toward the central opening 34 and shaped to receive and hold the tube tip 20 firmly against movement in a rotative direction.

While there has been described what is at present thought to be preferred embodiments of the invention, it can be understood that many modifications may be made therein and it is intended to cover in the appended claims all such modifications as fall within the true spirit and scope of the invention.

The invention claimed is:

1. A adjustable plant support comprising a pointed stake adapted to be driven into the ground adjacent the plant to be supported, a telescoping tube fitted over said stake, a lower edge of said tube extending below the top of said stake, a collar fitted over said stake, an opening in said collar larger than the exterior dimensions of said stake to be readily movable therealong, and means on said collar for holding the bottom edge of said tube eccentrically of said stake whereby said tube lower edge depresses said collar eccentrically to frictionally grip said stake and hold the tube above the collar means.

2. A support as claimed in claim 1, in which said tube lower edge is cut diagonally, and in which said collar includes a shoulder extending eccentrically of said stake, said shoulder positioned to hold therein said tube diagonal lower edge to position said tube thereabove.

3. A plant support as claimed in claim 1, in which the opening on said collar is beveled to provide an edge for gripping said stake when pressure is exerted eccentrically on said collar by said tube.

4. An adjustable plant support comprising a pointed rod adapted to be driven into the ground adjacent the plant to be supported, a telescoping tube extending over at least a portion of said rod, a diagonal bottom tip on said tube eccentric of said rod, an annular collar having a center opening greater than diameter of said rod to be freely movable therealong to a preset height, a shoulder extending out of the plane of the collar annulus for retaining therein the diagonal tip of said tube eccentrically of said rod, alignable openings in said shoulder and in said tube tip, and a holding member fitted through said aligned openings to lock said tube on said collar and said shoulder.

References Cited by the Examiner

UNITED STATES PATENTS

| 1,707,113 | 3/1929 | Christ | 248—355 |
| 3,066,447 | 12/1962 | Reiterer et al. | 52—155 X |

FOREIGN PATENTS

| 284,564 | 2/1928 | Great Britain. |
| 225,698 | 9/1943 | Switzerland. |

RICHARD W. COOKE, Jr., *Primary Examiner.*